(12) United States Patent
Minami et al.

(10) Patent No.: US 8,564,882 B2
(45) Date of Patent: Oct. 22, 2013

(54) DIFFRACTIVE OPTICAL ELEMENT AND OPTICAL DEVICE

(75) Inventors: Kazuhiro Minami, Osaka (JP); Kazuhiro Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 412 days.

(21) Appl. No.: 13/092,212

(22) Filed: Apr. 22, 2011

(65) Prior Publication Data

US 2011/0261459 A1    Oct. 27, 2011

(30) Foreign Application Priority Data

Apr. 23, 2010  (JP) .................................. 2010-099782
Apr. 19, 2011  (JP) .................................. 2011-093131

(51) Int. Cl.
*G02B 5/18*    (2006.01)
(52) U.S. Cl.
USPC ......................................................... 359/576
(58) Field of Classification Search
USPC ......................................................... 359/576
See application file for complete search history.

(56) References Cited

U.S. PATENT DOCUMENTS

| | | | |
|---|---|---|---|
| 5,847,877 A | 12/1998 | Imamura et al. | |
| 2004/0217496 A1* | 11/2004 | Matsuda et al. | ................ 264/2.5 |
| 2010/0027122 A1* | 2/2010 | Fujimoto et al. | ............... 359/571 |

FOREIGN PATENT DOCUMENTS

JP          09-127321         5/1997

* cited by examiner

*Primary Examiner* — Alessandro Amari
(74) *Attorney, Agent, or Firm* — Renner, Otto, Boisselle & Sklar, LLP

(57) ABSTRACT

A diffractive optical element includes first and second optical members which are stacked. The first optical member includes a diffraction grating in which a plurality of raised portions each having a vertical surface and a surface inclined to the vertical surface are arranged. The second optical member includes a diffraction grating in which a plurality of recessed portions are arranged, to which the raised portions are fitted. The diffraction grating of the first optical member and the diffraction grating of the second optical member are in close contact with each other. A ridge portion of the raised portion defines a curved surface. A curvature radius R (μm) of the curved surface, a pitch P (mm) of the raised portions, and a refractive index difference $\Delta n_d$ between the first and second optical members satisfy a predetermined relationship.

4 Claims, 11 Drawing Sheets

DIFFRACTIVE OPTICAL ELEMENT AND OPTICAL DEVICE

CROSS-REFERENCE TO RELATED APPLICATION

This application claims priority to Japanese Patent Application No. 2010-099782 filed on Apr. 23, 2010 and Japanese Patent Application No. 2011-093131 filed on Apr. 19, 2011, the disclosure of which including the specification, the drawings, and the claims is hereby incorporated by reference in its entirety.

BACKGROUND

The present disclosure relates to a diffractive optical element in which two optical members are stacked, and a diffraction grating is formed at an interface between the two optical members, and to an optical device including the diffractive optical element.

A diffractive optical element has been known, in which a plurality of optical members are stacked, and a relief pattern is formed at an interface between the optical members.

In a diffractive optical element described in, e.g., Japanese Patent Publication No. H09-127321, a plurality of optical members are stacked, and diffraction gratings having a sawtooth cross section are formed at an interface between the optical members. More specifically, one of the diffraction gratings is configured so that a plurality of crest-like raised portions each having a vertical wall and a wall inclined to the vertical wall are arranged at a predetermined pitch, and the other diffraction grating is configured so that a plurality of valley-like recessed portions engaged with the raised portions are arranged at the same pitch as that of the raised portions.

SUMMARY

Generally, a mold with an inverted shape of a diffraction grating having a desired shape is formed, and then the foregoing optical member having the diffraction grating is molded by such a mold. In such a manner, the optical member is manufactured, to which the inverted shape of the mold is transferred. In the optical member manufactured in this manner, it is important to precisely form the inverted shape in the mold. Such a mold is typically processed by cutting with a turning tool or grinding with a grindstone. However, such processing is difficult because a shape of the diffraction grating is microscopic. In particular, it is necessary that a valley bottom portion of the inverted shape is processed in a sharpened shape. However, since the turning tool or the grindstone has a certain size, it is difficult to form the valley bottom portion in an ideal shape. If the valley bottom portion of the inverted shape cannot be formed in the sharpened shape, a ridge portion of a crest of the diffraction grating is deformed, which is formed corresponding to the valley bottom portion. The deformation of the ridge portion of the crest of the diffraction grating causes degradation of diffraction efficiency or a change in wavelength characteristics.

Even if the ideal inverted shape can be formed in the mold, molding material does not reach a tip end of the valley bottom of the inverted shape in a case where molding material having high viscosity is used for molding. Consequently, the diffraction grating with the deformed ridge portion of the crest is formed.

Further, even if the mold having the ideal inverted shape can be formed, and the sharpened crest-like diffraction grating can be molded, there is a problem that chipping is likely to cause because the ridge portion of the crest of the diffraction grating is sharpened. In such a case, the deformed ridge portion of the crest of the diffraction grating causes the degradation of the diffraction efficiency or the change in wavelength characteristics.

The technique disclosed herein has been made in view of the foregoing, and it is an objective of the technique to maintain diffraction efficiency high without a sharpened ridge portion of a crest of a diffraction grating.

A technique disclosed herein is intended for A diffractive optical element including first and second optical members which are stacked. The first optical member includes a diffraction grating in which a plurality of raised portions each having a vertical surface and a surface inclined to the vertical surface are arranged. The second optical member includes a diffraction grating in which a plurality of recessed portions are arranged, to which the raised portions are fitted. The diffraction grating of the first optical member and the diffraction grating of the second optical member are in close contact with each other. A ridge portion formed by the vertical and inclined surfaces of the raised portion defines a curved surface. The following expression (1) is satisfied when a curvature radius of the curved surface is R (μm) and a pitch of the raised portions is P (mm):

$$R \leq A_1 \times P^3 + B_1 \times P^2 + C_1 \times P \tag{1}$$

where $\Delta n_d$ is a refractive index difference between the first and second optical members at a d line, $A_1 = -78479 \times \Delta n_d^2 + 20869 \times \Delta n_d + 36.356$, $B_1 = 19085 \times \Delta n_d^2 + 5119.7 \times \Delta n_d - 370.98$, and $C_1 = 2050 \times \Delta n_d^2 - 896.21 \times \Delta n_d + 143.61$ An optical device disclosed herein includes an optical imaging system configured to focus light bundles on a predetermined surface. The optical imaging system has the diffractive optical element.

According to the technique disclosed herein, the diffraction efficiency can be maintained high even if the diffractive optical element has the diffraction grating in which the plurality of raised portions with the rounded ridge portions are arranged.

DETAILED DESCRIPTION

An embodiment will be described below in detail with reference to the drawings.

<<Embodiment of the Present Disclosure>>

Figure 1:
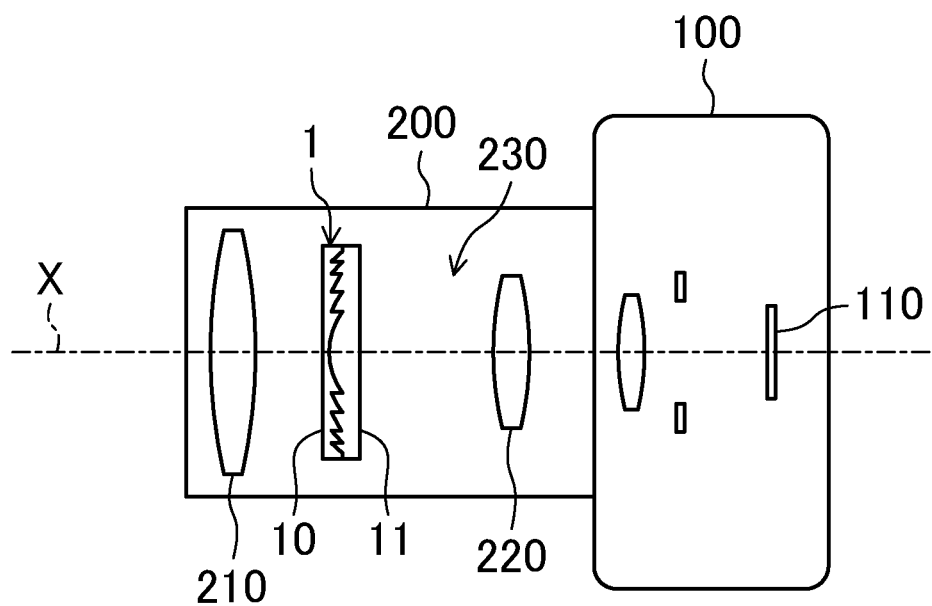
FIG. 1 is a schematic view of a camera to which an interchangeable lens of an embodiment is attached.
Figure 2:
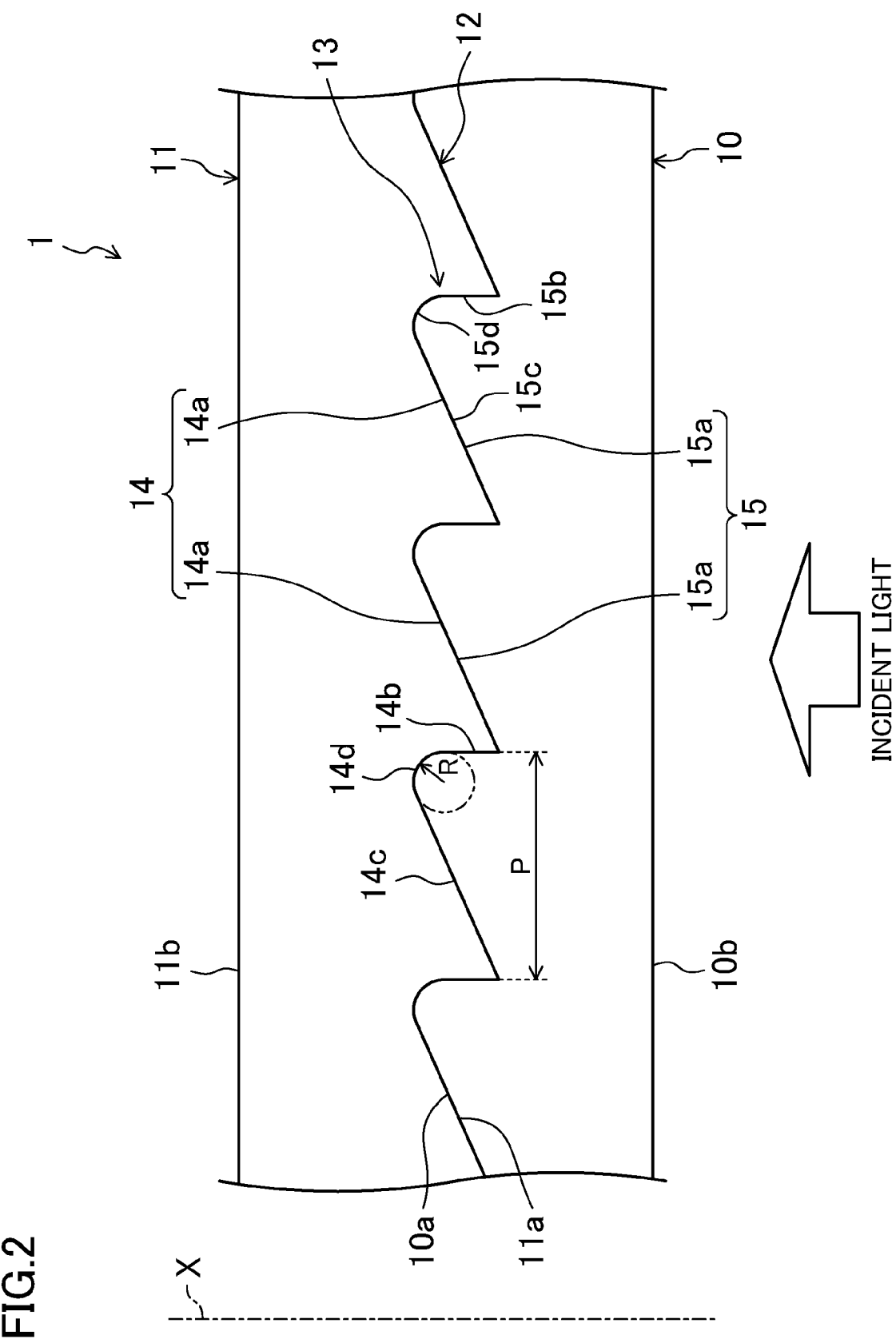
FIG. 2 is a schematic cross-sectional view of a diffractive optical element.

FIG. 1 is a schematic view of an interchangeable lens 200 including a diffractive optical element 1 of an example embodiment, and a camera 100 to which the interchangeable lens 200 is attached. FIG. 2 is a schematic cross-sectional view of the diffractive optical element 1.

The interchangeable lens 200 is detachable from the camera 100. The interchangeable lens 200 is, e.g., a telephoto zoom lens. In the interchangeable lens 200, the diffractive optical element 1 serves as a lens element in addition to refractive lenses 210, 220.

The refractive lenses 210, 220 and the diffractive optical element 1 form an optical imaging system 230 configured to focus light bundles on an imaging element 110 of the camera 100. The interchangeable lens 200 forms an optical device.

The diffractive optical element 1 is a close-contact type multilayer diffractive optical element in which a first optical member 10 and a second optical member 11 having light transmission properties are stacked. In the present embodiment, the first optical member 10 is made of glass material, and the second optical member 11 is made of resin material. The first optical member 10 and the second optical member 11 are bonded together. A diffraction grating 13 having a saw-tooth cross section is formed at an interface 12 defined by a bonding surface 10a of the first optical member 10 and a bonding surface 11a of the second optical member 11. Optical power of the diffraction grating 13 has wavelength dependency. Thus, the diffraction grating 13 provides the substantially same phase difference to light having different wavelengths, and diffracts the light having different wavelengths at diffraction angles which are different from each other. The diffraction grating 13 is formed of a first diffraction grating 14 which is formed in a raised shape in the bonding surface 10a of the first optical member 10, and a second diffraction grating 15 which is formed in a recessed shape in the bonding surface 11a of the second optical member 11.

Specifically, the first diffraction grating 14 includes a plurality of crest-like raised portions 14a which extend in a circumferential direction around an optical axis X of the diffractive optical element 1, and which are concentrically arranged around the optical axis X. Each of the raised portions 14a has a vertical surface 14b which is substantially parallel to the optical axis X (i.e., extends along the optical axis X), and a surface 14c which is inclined to the optical axis X (i.e., inclined to the vertical surface 14b). Each of the raised portions 14a has a substantially triangular cross section. In each of the raised portions 14a, a ridge portion (portion at an edge of a crest) 14d formed by the vertical surface 14b and the inclined surface 14c defines a curved surface.

The second diffraction grating 15 includes a plurality of valley-like recessed portions 15a which extend in the circumferential direction around the optical axis X of the diffractive optical element 1, and which are concentrically arranged around the optical axis X. Each of the recessed portions 15a has a vertical surface 15b which is substantially parallel to the optical axis X, and a surface 15c which is inclined to the optical axis X. Each of the recessed portions 15a has a substantially triangular cross section. In each of the recessed portions 15a, a valley bottom portion 15d formed by the vertical surface 15b and the inclined surface 15c defines a curved surface.

The first diffraction grating 14 and the second diffraction grating 15 have the same grating height and the same grating pitch. That is, the raised portions 14a of the first diffraction grating 14 are exactly fitted into the recessed portions 15a of the second diffraction grating 15. Consequently, the bonding surface 10a of the first optical member 10 and the bonding surface 11a of the second optical member 11 contact each other without clearances, thereby defining the single interface 12. The first diffraction grating 14 and the second diffraction grating 15 monolithically form the diffraction grating 13. Note that, if the bonding surface 10a and the bonding surface 11a are substantially parallel to each other, an intermediate layer such as air, an antireflection film, and an adhesive, which has a refractive index different from those of the first diffraction grating 14 and the second diffraction grating 15 may be interposed between the bonding surface 10a and the bonding surface 11a. For example, the valley bottom portion 15d formed by the vertical surface 15b and the inclined surface 15c of the recessed portion 15a may have a sharpened shape, whereas only the ridge portion 14d of the raised portion 14a may have a rounded shape.

The inclined surface 14c of the raised portion 14a of the first diffraction grating 14 and the inclined surface 15c of the recessed portion 15a of the second diffraction grating 15 may be curved so as to define an aspherical or spherical surface.

A surface 10b of the first optical member 10 on an opposite side of the bonding surface 10a, and a surface 11b of the second optical member 11 on an opposite side of the bonding surface 11a are formed into flat surfaces parallel to each other. As illustrated in FIG. 1, e.g., light entering the diffractive optical element 1 from the first optical member 10 side is diffracted at the diffraction grating 13 to exit to the second optical member 11 side. Note that the surface 10b of the first optical member 10 and the surface 11b of the second optical member 11 may not be parallel to each other.

Next, one example of a manufacturing method of the diffractive optical element 1 configured as described above will be briefly described. First, a mold having an inverted shape of the first diffraction grating 14 is prepared. The mold is filled with softened glass material. Then, the first optical member 10 is molded. Subsequently, the first optical member 10 is arranged in another mold so that the first diffraction grating 14 faces an inside of the mold. The mold in which the first optical member 10 is arranged is filled with molten resin. Consequently, the second optical member 11 is stacked on the first diffraction grating 14 of the first optical member 10. In such a state, the molten resin flows into valley portions of the first diffraction grating 14, and the second optical member 11 is molded, which includes the second diffraction grating 15 contacting the first diffraction grating 14. Note that the foregoing manufacturing method is one example, and any manufacturing methods are applicable as long as the diffractive optical element 1 can be manufactured.

In the mold, it is difficult that valley portions of the inverted shape are formed in a sharpened shape, and thus the valley portions of the inverted shape are rounded corresponding to a shape of a turning tool or a grindstone used for processing. As a result of molding with such a mold, the ridge portions 14d of the first diffraction grating 14 of the first optical member 10 are also rounded. At the rounded ridge portion 14d, light cannot be properly diffracted, thereby degrading diffraction efficiency of the diffraction grating 13. In the recessed portion 15a of the second diffraction grating 15, to which the raised portion 14a of the first diffraction grating 14 is fitted, the valley bottom portion 15d also defines a curved surface corresponding to the ridge portion 14d.

The diffractive optical element 1 of the present embodiment is configured so as to satisfy the following expression (1):

$$R \leq A_1 \times P^3 + B_1 \times P^2 + C_1 \times P \quad (1)$$

where "R" represents a curvature radius (μm) of the curved surface of the raised portion 14a, "P" represents a pitch (mm) of the raised portions 14a, "$\Delta n_d$" represents a refractive index difference between the first optical member 10 and the second optical member 11 at a d line, $A_1 = -78479 \times \Delta n_d^2 + 20869 \times \Delta n_d + 36.356$, $B_1 = 19085 \times \Delta n_d^2 + 5119.7 \times \Delta n_d - 370.98$, and $C_1 = 2050 \times \Delta n_d^2 - 896.21 \times \Delta n_d + 143.61$.

That is, the diffractive optical element 1 is configured so that the curvature radius R of the ridge portion 14d of the raised portion 14a satisfies the expression (1) in a relationship between the refractive index difference $\Delta n_d$ between the first optical member 10 and the second optical member 11 at the d line (hereinafter merely referred to as a "refractive index difference $\Delta n_d$"), and the pitch P of the raised portions 14a of the first diffraction grating 14. Thus, the diffraction efficiency for a blaze wavelength can be maintained to equal to or greater than about 85%.

It is preferable that the expression (1) is satisfied for all of the raised portions 14a in an effective radius of the diffractive optical element 1. In other words, even for the same curvature radius R, a smaller pitch P results in degradation of the diffraction efficiency. Thus, it is preferable that the expression (1) is satisfied for the raised portions 14a with the smallest pitch in the effective radius of the diffractive optical element 1. In such a case, the expression (1) is logically satisfied for the raised portions 14a having a pitch lager than the smallest pitch.

The diffractive optical element 1 preferably satisfies the following expression (2):

$$R \leq A_2 \times P^3 + B_2 \times P^2 + C_2 \times P \quad (2)$$

where $A_2 = -19157 \times \Delta n_d^2 + 5549.6 \times \Delta n_d + 54.034$, $B_2 = 8026.7 \times \Delta n_d^2 + 2402.2 \times \Delta n_d - 198.94$, and $C_2 = 1475.7 \times \Delta n_d^2 - 690.85 \times \Delta n_d + 106.82$ Thus, the diffraction efficiency of the diffractive optical element 1 for the blaze wavelength can be maintained to equal to or greater than about 90%.

Further, the diffractive optical element 1 preferably satisfies the following expression (3):

$$R \leq A_3 \times P^3 + B_3 \times P^2 + C_3 \times P \quad (3)$$

where $A_3 = 2454 \times \Delta n_d^2 + 70.325 \times \Delta n_d + 45.923$, $B_3 = -2331.4 \times \Delta n_d^2 + 1285.6 \times \Delta n_d - 102.5$, and $C_3 = 1812.2 \times \Delta n_d^2 - 572.71 \times \Delta n_d + 72.458$ Thus, the diffraction efficiency of the diffractive optical element 1 for the blaze wavelength can be maintained to equal to or greater than about 95%.

EXAMPLES

Examples of the diffractive optical element will be described below.

First, a model of a diffractive optical element 1 was produced, in which a blaze wavelength $\lambda_b$ was set to a d line, a first optical member 10 is made of glass, the second optical member 11 is made of resin, and a ridge portion 14d of a raised portion 14a defines a curved surface. Suppose that incident light enters parallel to an optical axis X through a surface 10b of the first optical member 10. By performing a simulation by a RCWA (rigorous coupled wave analysis) method while changing a refractive index difference $\Delta n_d$ between the first optical member 10 and the second optical member 11, a pitch P (mm) of the raised portions 14a, and a curvature radius R (μm) of the ridge portion 14d of the raised portion 14a, diffraction efficiency of first-order diffracted light for the blaze wavelength $\lambda_b$ was obtained. Materials of the first optical member 10 and the second optical member 11 were selected so that light having a wavelength other than the blaze wavelength $\lambda_b$ is also diffracted into the first order. Results of the simulation performed in such a manner are shown in FIGS. 3-6.

Figure 3:
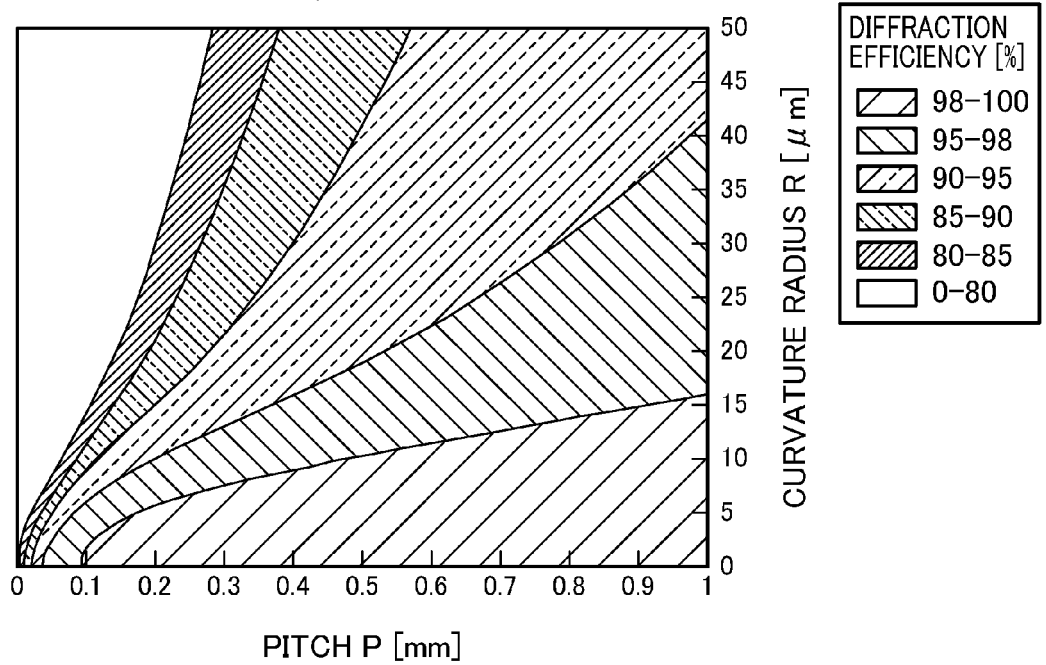
FIG. 3 is a graph illustrating a relationship of diffraction efficiency with a pitch of raised sections of a diffraction grating and a curvature radius when a refractive index difference $\Delta n_d$ is about 0.03.
Figure 4:
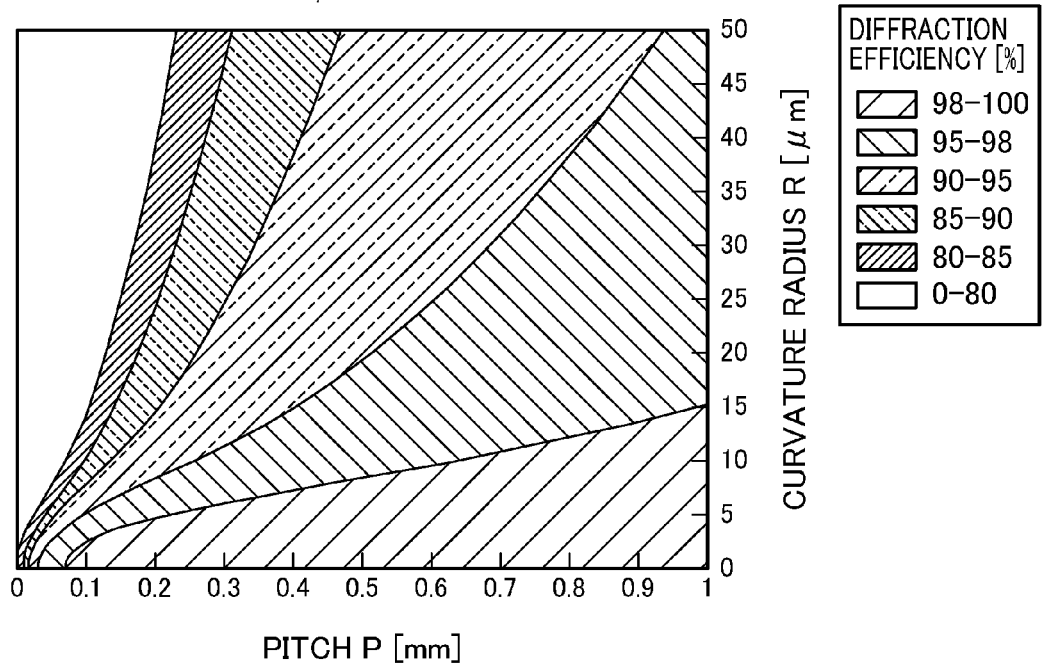
FIG. 4 is a graph illustrating the relationship of the diffraction efficiency with the pitch of the raised sections of the diffraction grating and the curvature radius when the refractive index difference $\Delta n_d$ is about 0.05.
Figure 5:
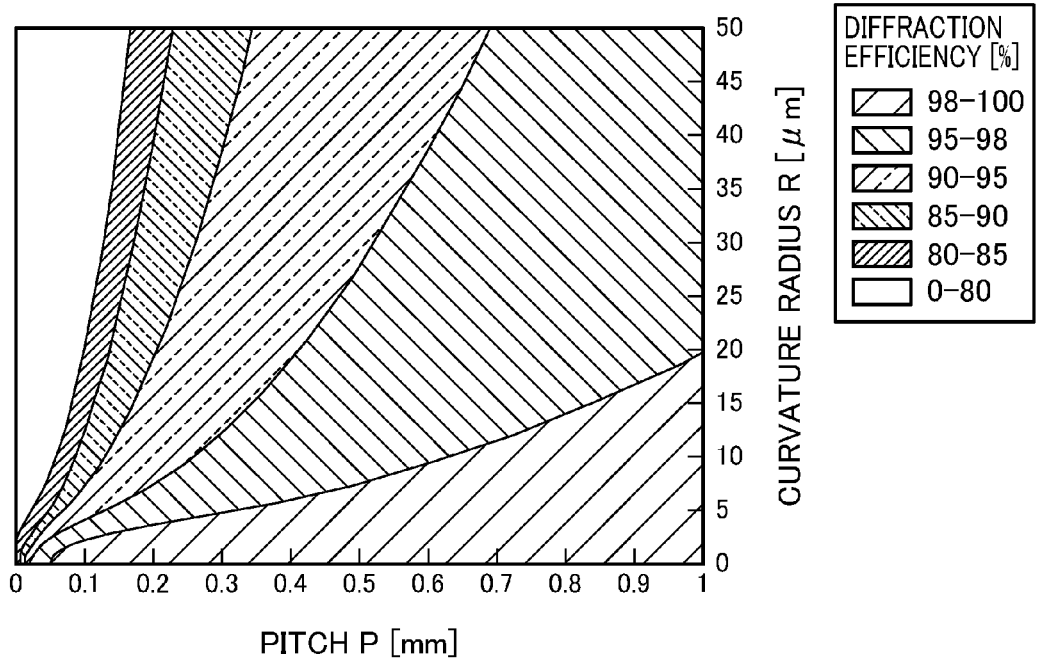
FIG. 5 is a graph illustrating the relationship of the diffraction efficiency with the pitch of the raised sections of the diffraction grating and the curvature radius when the refractive index difference $\Delta n_d$ is about 0.10.
Figure 6:
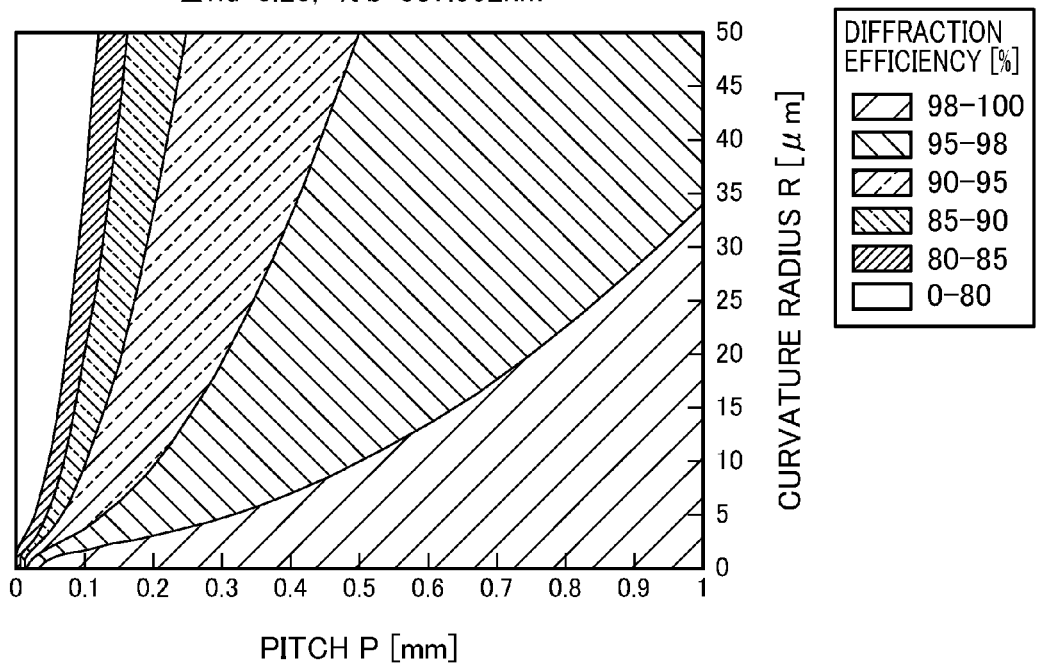
FIG. 6 is a graph illustrating the relationship of the diffraction efficiency with the pitch of the raised sections of the diffraction grating and the curvature radius when the refractive index difference $\Delta n_d$ is about 0.20.

FIGS. 3-6 illustrate a relationship of the diffraction efficiency with the pitch P of the raised portions 14a and the curvature radius R for various refractive index differences $\Delta n_d$. Specifically, FIG. 3 illustrates the relationship of the diffraction efficiency with the pitch P of the raised portions 14a and the curvature radius R when the refractive index difference $\Delta n_d$ is about 0.03 (a refractive index $n_d$ of the first optical member 10 is about 1.57, and an Abbe number $v_d$ of the first optical member 10 is about 71.2; and a refractive index $n_d$ of the second optical member 11 is about 1.54, and an Abbe number $v_d$ of the second optical member 11 is about 42.1). FIG. 4 illustrates the relationship of the diffraction efficiency with the pitch P of the raised portions 14a and the curvature radius R when the refractive index difference is about 0.05 (the refractive index $n_d$ of the first optical member 10 is about 1.65, and the Abbe number $v_d$ of the first optical member 10 is about 47.9; and the refractive index $n_d$ of the second optical member 11 is about 1.60, and the Abbe number $v_d$ of the second optical member 11 is about 27.7). FIG. 5 illustrates the relationship of the diffraction efficiency with the pitch P of the raised portions 14a and the curvature radius R when the refractive index difference is about 0.10 (the refractive index $n_d$ of the first optical member 10 is about 1.80, and the Abbe number $v_d$ of the first optical member 10 is about 39.6; and the refractive index $n_d$ of the second optical member 11 is about 1.70, and the Abbe number $v_d$ of the second optical member 11 is about 19.3). FIG. 6 illustrates the relationship of the diffraction efficiency with the pitch P of the raised portions 14a and the curvature radius R when the refractive index difference is about 0.20 (the refractive index $n_d$ of the first optical member 10 is about 2.10, and the Abbe number $v_d$ of the first optical member 10 is about 32.9; and the refractive index $n_d$ of the second optical member 11 is about 1.90, and the Abbe number $v_d$ of the second optical member 11 is about 13.7). The diffraction efficiency is obtained by (an amount of first-order diffracted light)/(total transmitted light amount). The results of the simulation show that the diffraction efficiency for the blaze wavelength $\lambda_b$ can be equal to or greater than about 85% within a range satisfying the following expression (1):

$$R \leq A_1 \times P^3 + B_1 \times P^2 + C_1 \times P \qquad (1)$$

where $A_1 = -78479 \times \Delta n_d^2 + 20869 \times \Delta n_d + 36.356$, $B_1 = 19085 \times \Delta n_d^2 + 5119.7 \times \Delta n_d - 370.98$, and $C_1 = 2050 \times \Delta n_d^2 - 896.21 \times \Delta n_d + 143.61$ Thus, even if the ridge portion 14d of the first diffraction grating 14 is rounded, i.e., defines the curved surface, the diffraction efficiency can be maintained high (specifically, the diffraction efficiency for the blaze wavelength $\lambda_b$ is maintained to equal to or greater than about 85%) as long as the curvature radius R of the ridge portion 14d satisfies the expression (1) in a relationship between the refractive index difference $\Delta n_d$ between the first optical member 10 and the second optical member 11, and the pitch P (mm) of the raised portions 14a.

Figure 7:
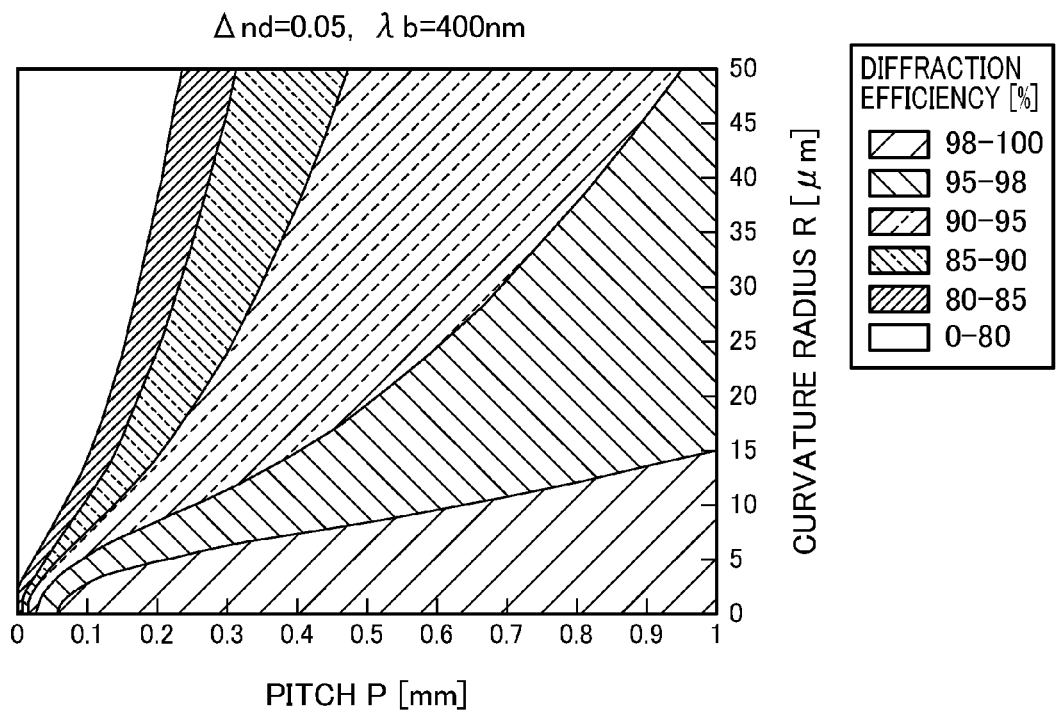
FIG. 7 is a graph illustrating the relationship of the diffraction efficiency with the pitch of the raised sections of the diffraction grating and the curvature radius when a blaze wavelength is about 400 nm and the refractive index difference $\Delta n_d$ is about 0.05.
Figure 8:
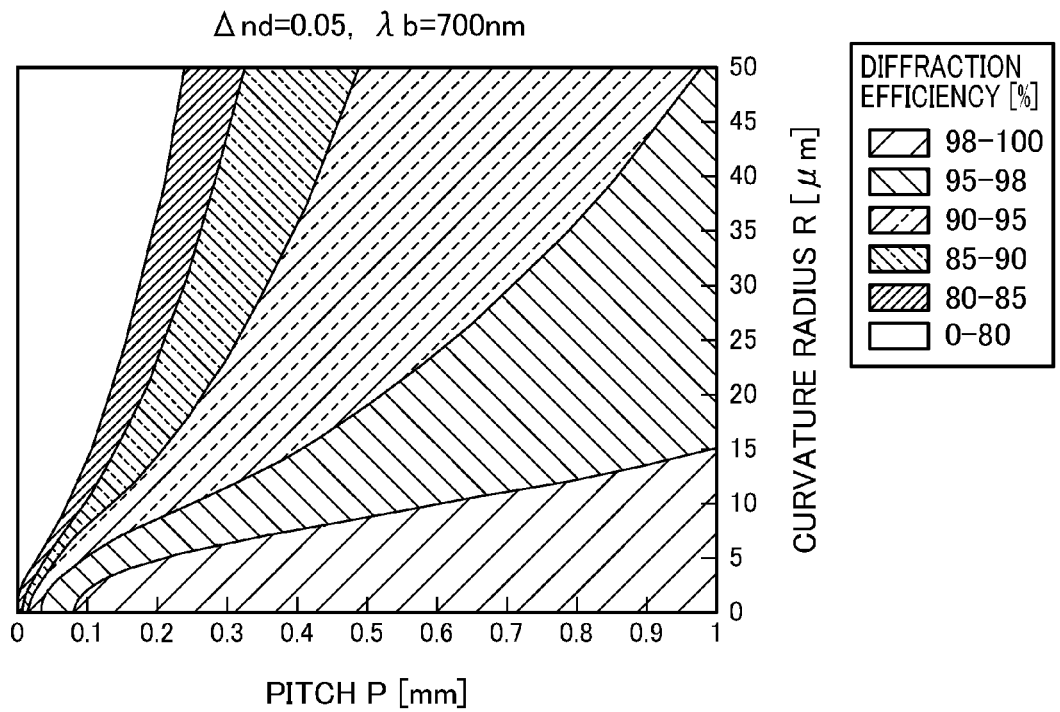
FIG. 8 is a graph illustrating the relationship of the diffraction efficiency with the pitch of the raised sections of the diffraction grating and the curvature radius when the blaze wavelength is about 700 nm and the refractive index difference $\Delta n_d$ is about 0.05.

The diffraction efficiency for the blaze wavelength $\lambda_b$ can be equal to or greater than about 90% within a range satisfying the following expression (2):

$$R \leq A_2 \times P^3 + B_2 \times P^2 + C_2 \times P \qquad (2)$$

where $A_2 = -19157 \times \Delta n_d^2 + 5549.6 \times \Delta n_d + 54.034$, $B_2 = 8026.7 \times \Delta n_d^2 + 2402.2 \times \Delta n_d - 198.94$, and $C_2 = 1475.7 \times \Delta n_d^2 - 690.85 \times \Delta n_d + 106.82$ Further, the diffraction efficiency for the blaze wavelength $\lambda_b$ can be equal to or greater than about 95% within a range satisfying the following expression (3):

$$R \leq A_3 \times P^3 + B_3 \times P^2 + C_3 \times P \qquad (3)$$

where $A_3 = 2454 \times \Delta n_d^2 + 70.325 \times \Delta n_d + 45.923$, $B_3 = -2331.4 \times \Delta n_d^2 + 1285.6 \times \Delta n_d - 102.5$, and $C_3 = 1812.2 \times \Delta n_d^2 - 572.71 \times \Delta n_d + 72.458$ In the foregoing example, the blaze wavelength $\lambda_b$ is set to the d line. Results when the blaze wavelength $\lambda_b$ is set to a line other than the d line are shown in FIGS. 7 and 8. FIG. 7 illustrates the result when the blaze wavelength $\lambda_b$ is set to about 400 nm which is near a lower limit of a visible wavelength range, and FIG. 8 illustrates the result when the blaze wavelength $\lambda_b$ is set to about 700 nm which is near an upper limit of the visible wavelength range. Note that, in both of the results, the refractive index difference $\Delta n_d$ is about 0.05 (the refractive index $n_d$ of the first optical member 10 is about 1.65, and the Abbe number $v_d$ of the first optical member 10 is about 47.9; and the refractive index $n_d$ of the second optical member 11 is about 1.60, and the Abbe number $v_d$ of the second optical member 11 is about 27.7). In addition, in both of the results, the diffraction efficiency for each of the blaze wavelengths $\lambda_b$ is calculated. A refractive index $n(\lambda_b)$ of the first optical member 10 for each of the blaze wavelengths $\lambda_b$ (μm) and a refractive index $n(\lambda_b)$ of the second optical member 11 for each of the blaze wavelengths $\lambda_b$ (μm), which are used for such calculation are calculated by substituting "$\lambda$" of the following Hertzberger's expressions (4)-(6) with "$\lambda_b$:"

$$A(\lambda) = 0.088927 \times \lambda^2 - 1.294878 + 0.37349/(\lambda^2 - 0.035) + 0.005799/(\lambda^2 - 0.035)^2 \qquad (4)$$

$$B(\lambda) = -0.007058 \times \lambda^2 + 0.001255 + 0.001071/(\lambda^2 - 0.035) - 0.000218/(\lambda^2 - 0.035)^2 \qquad (5)$$

$$n(\lambda) = 1 + (n_d - 1) \times \{1 + B(\lambda) + (A(\lambda)/v_d)\} \qquad (6)$$

That is, the refractive index $n(\lambda_d)$ and the Abbe number $v_d$ of the first optical member 10 at the d line are used to obtain the refractive index $n(\lambda_b)$ of the first optical member 10 for each of the blaze wavelengths $\lambda_b$ (μm) based on the expressions (4)-(6). In addition, the refractive index $n(\lambda_d)$ and the Abbe number $v_d$ of the second optical member 11 at the d line are used to obtain the refractive index $n(\lambda_b)$ of the second optical member 11 for each of the blaze wavelengths $\lambda_b$ (μm) based on the expressions (4)-(6).

As will be seen when comparing the results of FIGS. 7 and 8 with the result of FIG. 4, even if the blaze wavelength $\lambda_b$ is changed, there is little change in curve in the graph. In this connection, the similar results were obtained for the other refractive index differences $\Delta n_d$. That is, regardless of the blaze wavelength $\lambda_b$, the diffraction efficiency for the blaze wavelength $\lambda_b$ can be maintained high by satisfying the expressions (1)-(3).

Generally, in the diffraction grating, a smaller refractive index difference $\Delta n_d$ requires a higher grating height, and results in degradation of angular characteristics (i.e., diffraction efficiency change characteristics depending on an angle of incident, and the angular characteristics are good when an increase in angle of incident causes little change in diffraction efficiency). Thus, it is preferable that the refractive index difference $\Delta n_d > 0.05$. This allows a lower grating height, thereby improving the angular characteristics of the diffraction efficiency.

Subsequently, by selecting the refractive index difference $\Delta n_d$ between the first optical member 10 and the second optical member 11, the pitch P (mm) of the raised portions 14a, and the curvature radius R (μm) of the ridge portion 14d of the raised portion 14a, which satisfy the expressions (1)-(3), and performing a simulation by the RCWA method, the diffraction efficiency of first-order diffracted light for each of wavelengths $\lambda$ of the visible wavelength range is obtained.

First Example

In a first example, a first optical member 10 was made of hypothetical glass having a refractive index $n_d$ of about 1.57 and an Abbe number $v_d$ of about 71.2 at a d line, and the second optical member 11 was made of hypothetical resin having a refractive index $n_d$ of about 1.54 and an Abbe number $v_d$ of about 42.1 at the d line. As a result, a refractive index difference $\Delta n_d$ was about 0.03. In order to realize diffraction efficiency of equal to or greater than about 85% for a blaze wavelength $\lambda_b$, a pitch P was set to about 0.1 (mm) and a curvature radius R was set to about 10 (μm) so as to satisfy the expression (1). The blaze wavelength $\lambda_b$ was set to the d line. A grating height in this case was about 19.59 (μm). By using the RCWA method, the diffraction efficiency for each of wavelengths $\lambda$ in a visible wavelength range was calculated. Refractive indexes $n_1(\lambda)$, $n_2(\lambda)$ of the first and second optical members 10, 11 for each of the wavelengths $\lambda$ (μm), which were used for such calculation were calculated based on the foregoing Hertzberger's expressions (4)-(6). Note that, in second to eleventh examples below, the refractive indexes $n_1(\lambda)$, $n_2(\lambda)$ of the first and second optical members 10, 11 for each of the wavelengths $\lambda$ (μm) were calculated as in the present example.

Figure 9:
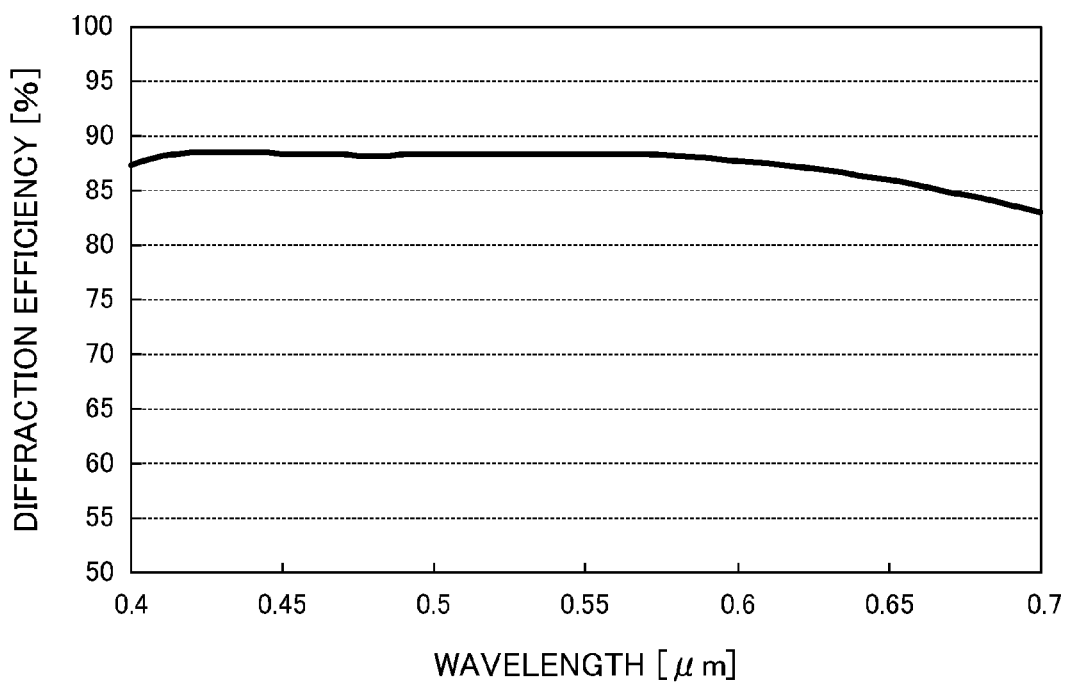
FIG. 9 is a graph illustrating diffraction efficiency in a visible wavelength range of a diffraction grating of a first example.

The result is shown in FIG. 9. The diffraction efficiency at the d line is about 88.1%, and the diffraction efficiency of equal to or greater than about 85% is realized as desired. The high diffraction efficiency which is equal to or greater than about 80% can be obtained across the entire visible wavelength range.

Second Example

In a second example, a first optical member 10 was made of hypothetical glass having a refractive index $n_d$ of about 1.65 and an Abbe number $v_d$ of about 47.9 at a d line, and the second optical member 11 was made of hypothetical resin having a refractive index $n_d$ of about 1.60 and an Abbe number $v_d$ of about 27.7 at the d line. As a result, a refractive index difference $\Delta n_d$ was about 0.05. In order to realize diffraction efficiency of equal to or greater than about 95% for a blaze wavelength $\lambda_b$, a pitch P was set to about 0.6 (mm) and a curvature radius R was set to about 25 (μm) so as to satisfy the expression (3). The blaze wavelength $\lambda_b$ was set to the d line. A grating height in this case was about 11.75 (μm). By using the RCWA method, diffraction efficiency for each of wavelengths $\lambda$ in a visible wavelength range was calculated.

Figure 10:
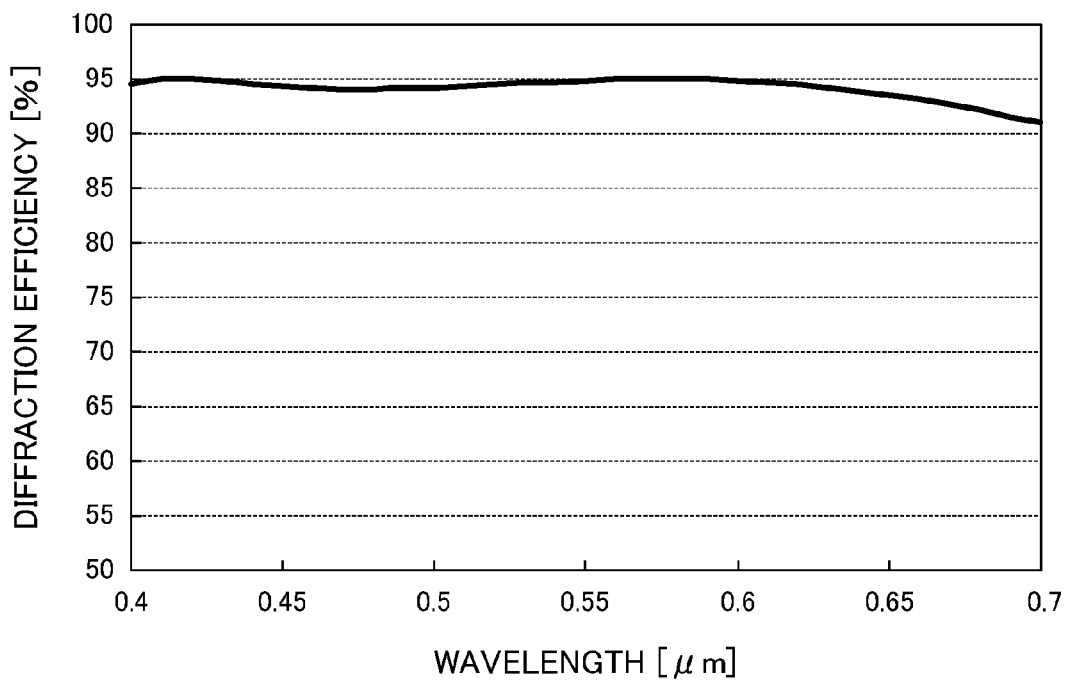
FIG. 10 is a graph illustrating diffraction efficiency in a visible wavelength range of a diffraction grating of a second example.

The result is shown in FIG. 10. The diffraction efficiency at the d line is about 95.0%, and the diffraction efficiency of equal to or greater than about 95% is realized as desired. The high diffraction efficiency which is equal to or greater than about 90% can be obtained across the entire visible wavelength range.

Third Example

In a third example, a first optical member 10 was made of hypothetical glass having a refractive index $n_d$ of about 1.80 and an Abbe number $v_d$ of about 39.6 at a d line, and the second optical member 11 was made of hypothetical resin having a refractive index $n_d$ of about 1.70 and an Abbe number $v_d$ of about 19.3 at the d line. As a result, a refractive index difference $\Delta n_d$ was about 0.10. In order to realize diffraction efficiency of equal to or greater than about 85% for a blaze wavelength $\lambda_b$, a pitch P was set to about 0.2 (mm) and a curvature radius R was set to about 35 (μm) so as to satisfy the expression (1). The blaze wavelength $\lambda_b$ was set to the d line. A grating height in this case was about 5.88 (μm). By using the RCWA method, diffraction efficiency for each of wavelengths $\lambda$ in a visible wavelength range was calculated.

Figure 11:
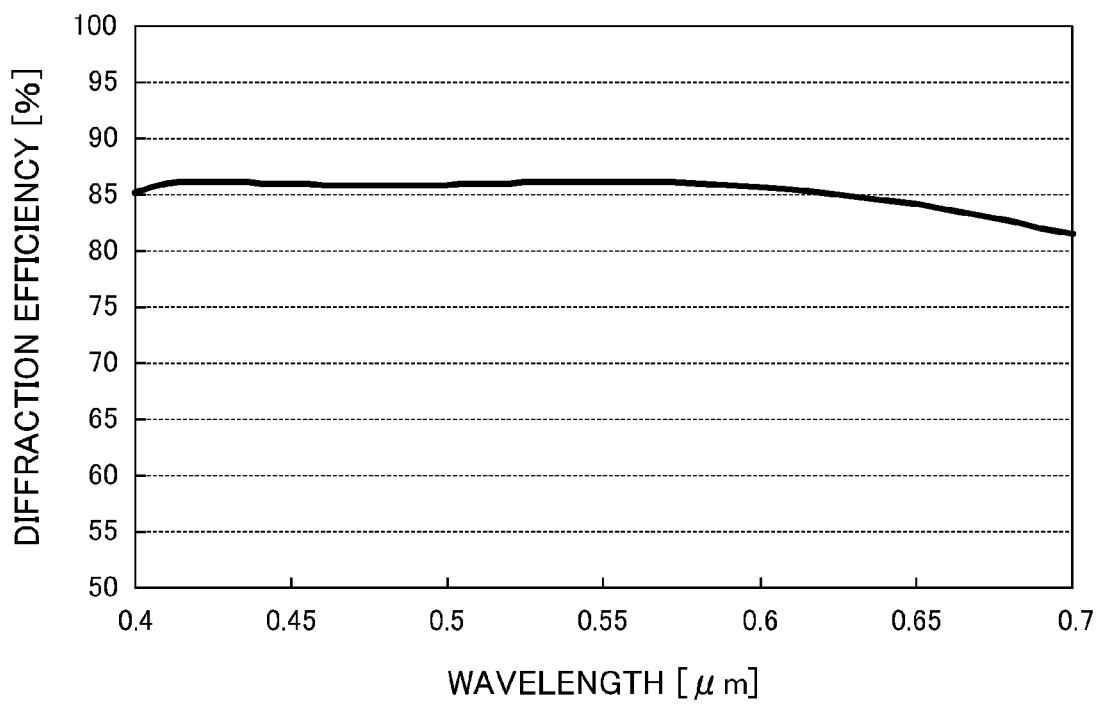
FIG. 11 is a graph illustrating diffraction efficiency in a visible wavelength range of a diffraction grating of a third example.

The result is shown in FIG. 11. The diffraction efficiency at the d line is about 86.0%, and the diffraction efficiency of equal to or greater than about 85% is realized as desired. The high diffraction efficiency which is equal to or greater than about 80% can be obtained across the entire visible wavelength range.

Fourth Example

In a fourth example, a first optical member 10 was made of hypothetical glass having a refractive index $n_d$ of about 2.10 and an Abbe number $v_d$ of about 32.9 at a d line, and the second optical member 11 was made of hypothetical resin having a refractive index $n_d$ of about 1.90 and an Abbe number $v_d$ of about 13.7 at the d line. As a result, a refractive index difference $\Delta n_d$ was about 0.20. In order to realize diffraction efficiency of equal to or greater than about 90% for a blaze wavelength $\lambda_b$, a pitch P was set to about 0.1 (mm) and a curvature radius R was set to about 5 (μm) so as to satisfy the expression (2). The blaze wavelength $\lambda_b$ was set to the d line. A grating height in this case was about 2.94 (μm). By using the RCWA method, diffraction efficiency for each of wavelengths $\lambda$ in a visible wavelength range was calculated.

Figure 12:
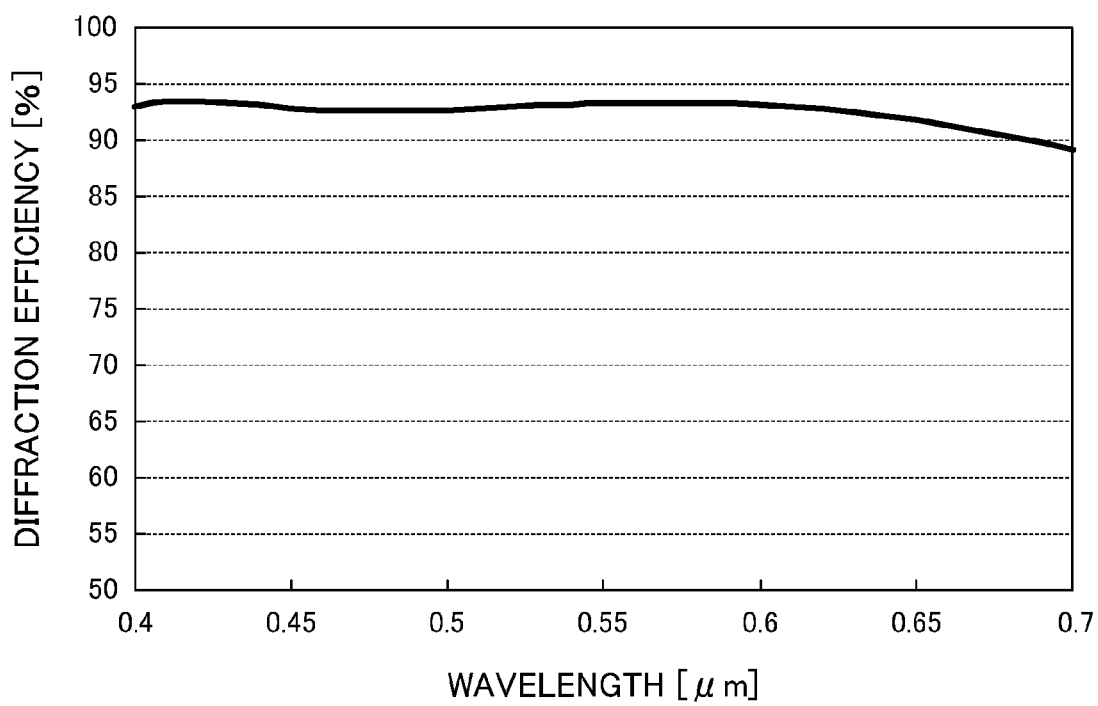
FIG. 12 is a graph illustrating diffraction efficiency in a visible wavelength range of a diffraction grating of a fourth example.

The result is shown in FIG. 12. The diffraction efficiency at the d line is about 93.6%, and the diffraction efficiency of equal to or greater than about 90% is realized as desired. The high diffraction efficiency which is equal to or greater than about 85% can be obtained across the entire visible wavelength range.

Fifth Example

In a fifth example, a first optical member 10 was made of glass (glass K-CD120 manufactured by Sumita Optical Glass Inc.) having a refractive index $n_d$ of about 1.7225 and an Abbe number $v_d$ of about 29.2 at a d line, and the second optical member 11 was made of hypothetical resin having a refractive index $n_d$ of about 1.675 and an Abbe number $v_d$ of about 20 at the d line. As a result, a refractive index difference $\Delta n_d$ was about 0.0475. In order to realize diffraction efficiency of equal to or greater than about 90% for a blaze wavelength $\lambda_b$, a pitch P was set to about 0.3 (mm) and a curvature radius R was set to about 20 (μm) so as to satisfy the expression (2). The blaze wavelength $\lambda_b$ was set to the d line. A grating height in this case was about 12.37 (μm). By using the RCWA method, diffraction efficiency for each of wavelengths $\lambda$ in a visible wavelength range was calculated.

Figure 13:
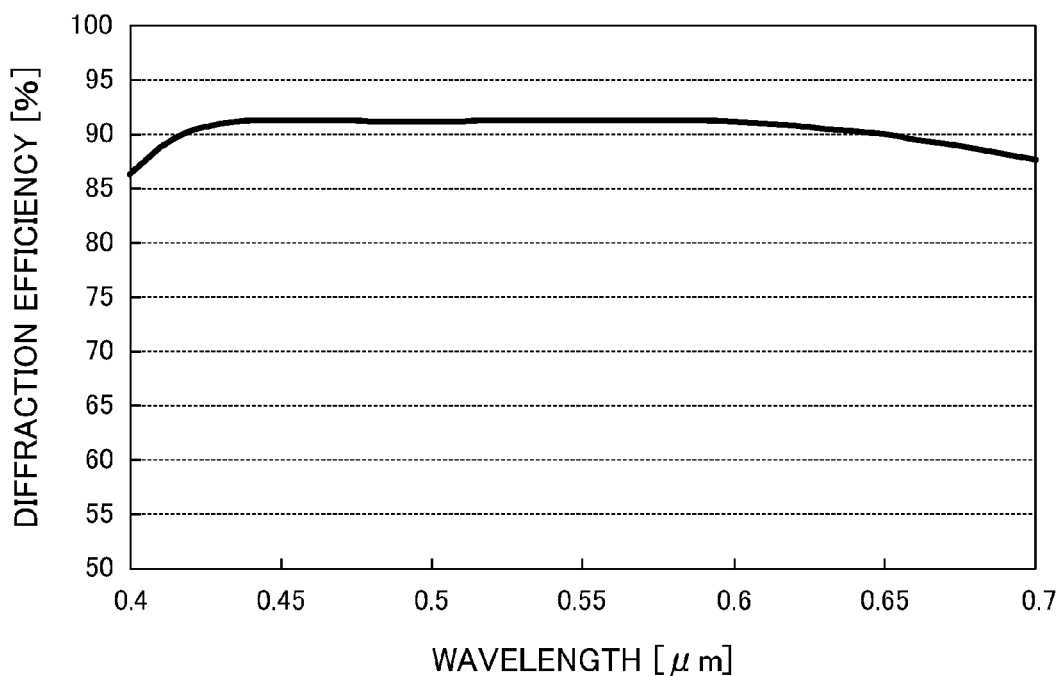
FIG. 13 is a graph illustrating diffraction efficiency in a visible wavelength range of a diffraction grating of a fifth example.

The result is shown in FIG. 13. The diffraction efficiency at the d line is about 91.3%, and the diffraction efficiency of equal to or greater than about 90% is realized as desired. The high diffraction efficiency which is equal to or greater than about 85% can be obtained across the entire visible wavelength range.

Sixth Example

In a sixth example, a first optical member 10 was made of glass (glass K-VC80 manufactured by Sumita Optical Glass Inc.) having a refractive index $n_d$ of about 1.69384 and an Abbe number $v_d$ of about 53.1 at a d line, and the second optical member 11 was made of glass (glass K-PG395 manufactured by Sumita Optical Glass Inc.) having a refractive index $n_d$ of about 1.658 and an Abbe number $v_d$ of about 36.86 at the d line. As a result, a refractive index difference $\Delta n_d$ was about 0.03584. In order to realize diffraction efficiency of equal to or greater than about 85% for a blaze wavelength $\lambda_b$, a pitch P was set to about 0.2 (mm) and a curvature radius R was set to about 20 (μm) so as to satisfy the expression (1). The blaze wavelength $\lambda_b$ was set to the d line. A grating height in this case was about 16.40 (μm). By using the RCWA method, diffraction efficiency for each of wavelengths $\lambda$ in a visible wavelength range was calculated.

Figure 14:
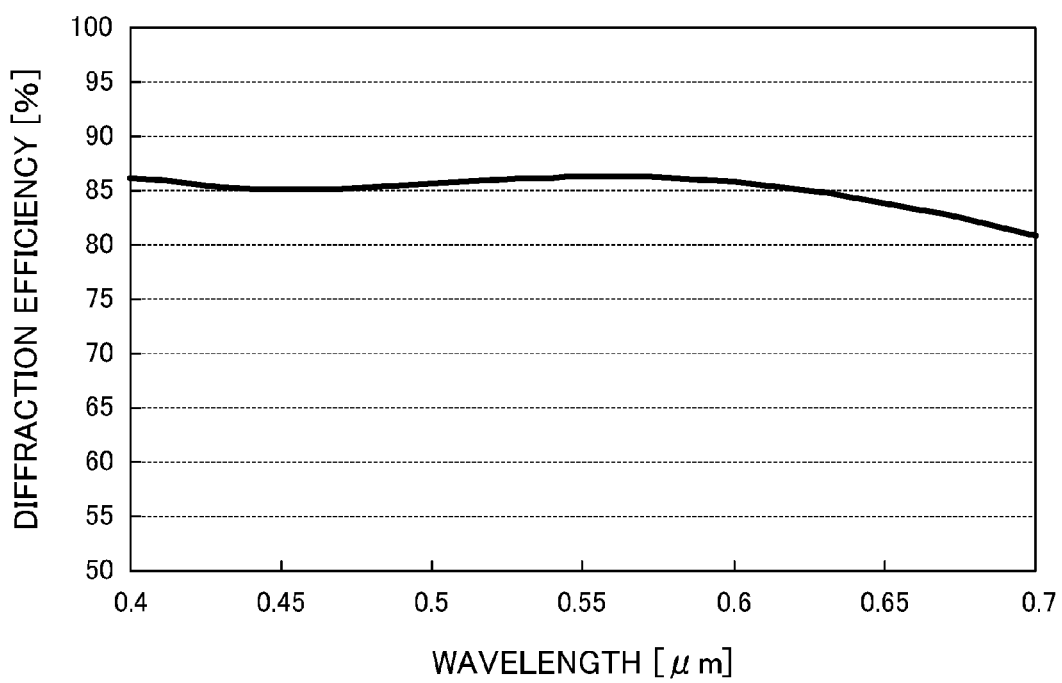
FIG. 14 is a graph illustrating diffraction efficiency in a visible wavelength range of a diffraction grating of a sixth example.

The result is shown in FIG. 14. The diffraction efficiency at the d line is about 86.0%, and the diffraction efficiency of equal to or greater than about 85% is realized as desired. The high diffraction efficiency of equal to or greater than about 80% can be obtained across the entire visible wavelength range.

Seventh Example

In a seventh example, a first optical member 10 was made of glass (glass K-VC78 manufactured by Sumita Optical Glass Inc.) having a refractive index $n_d$ of about 1.66955 and an Abbe number $v_d$ of about 55.4 at a d line, and the second optical member 11 was made of ultraviolet curable resin having a refractive index $n_d$ of about 1.606 and an Abbe number $v_d$ of about 27.3 at the d line. As a result, a refractive index difference $\Delta n_d$ was about 0.06355. In order to realize diffraction efficiency of equal to or greater than about 95% for a blaze wavelength $\lambda_b$, a pitch P was set to about 0.4 (mm) and a curvature radius R was set to about 15 (μm) so as to satisfy the expression (3). The blaze wavelength $\lambda_b$ was set to the d line. A grating height in this case was about 9.25 (μm). By using the RCWA method, diffraction efficiency for each of wavelengths λ in a visible wavelength range was calculated.

Figure 15:
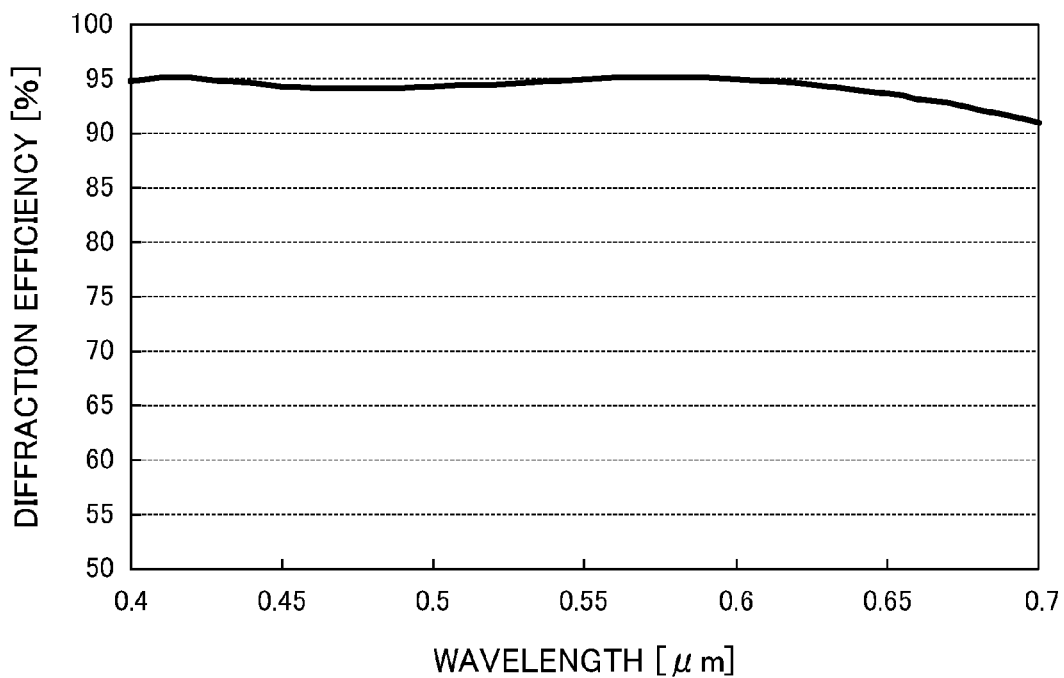
FIG. 15 is a graph illustrating diffraction efficiency in a visible wavelength range of a diffraction grating of a seventh example.

The result is shown in FIG. 15. The diffraction efficiency at the d line is about 95.1%, and the diffraction efficiency of equal to or greater than about 95% is realized as desired. The high diffraction efficiency which is equal to or greater than about 90% can be obtained across the entire visible wavelength range.

Eighth Example

In an eighth example, a first optical member 10 was made of glass (glass K-VC78 manufactured by Sumita Optical Glass Inc.) having a refractive index $n_d$ of about 1.66955 and an Abbe number $v_d$ of about 55.4 at a d line, and the second optical member 11 was made of ultraviolet curable resin having a refractive index $n_d$ of about 1.606 and an Abbe number $v_d$ of about 27.3 at the d line. As a result, a refractive index difference $\Delta n_d$ was about 0.06355. In order to realize diffraction efficiency of equal to or greater than about 95% for a blaze wavelength $\lambda_b$, a pitch P was set to about 0.4 (mm) and a curvature radius R was set to about 15 (μm) so as to satisfy the expression (3). The blaze wavelength $\lambda_b$ was set to an F line (about 0.486133 μm). A grating height in this case was about 8.65 (μm). By using the RCWA method, diffraction efficiency for each of wavelengths λ in a visible wavelength range was calculated.

Figure 16:
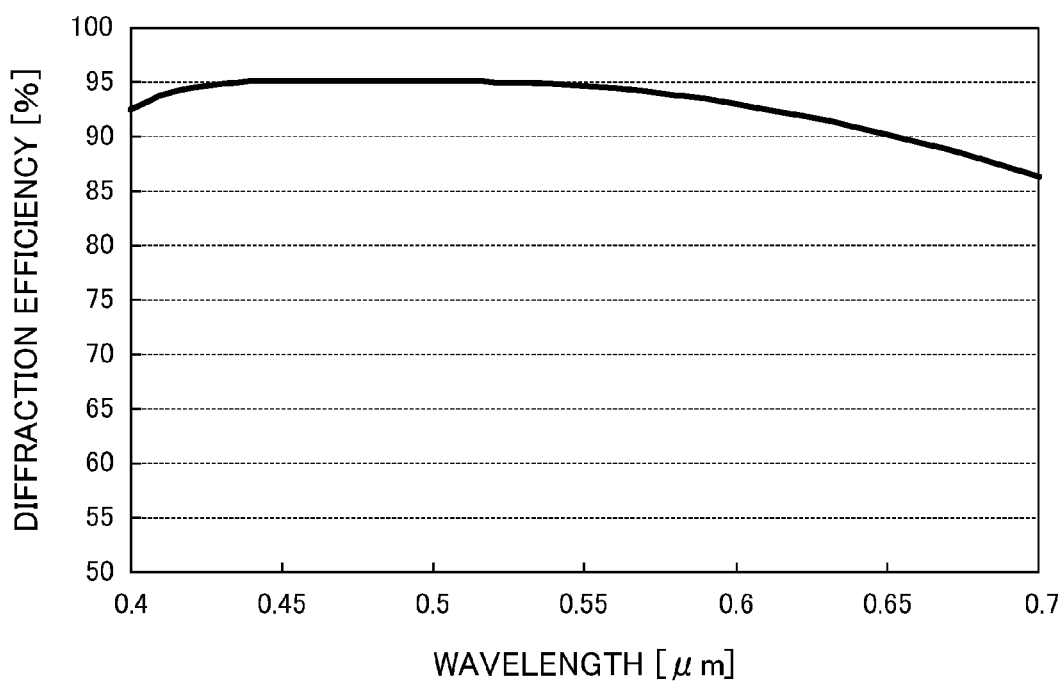
FIG. 16 is a graph illustrating diffraction efficiency in a visible wavelength range of a diffraction grating of an eighth example.

The result is shown in FIG. 16. The diffraction efficiency at the F line is about 95.2%, and the diffraction efficiency of equal to or greater than about 95% is realized as desired. The high diffraction efficiency which is equal to or greater than about 85% can be obtained across the entire visible wavelength range.

Ninth Example

In a ninth example, a first optical member 10 was made of glass (glass K-VC78 manufactured by Sumita Optical Glass Inc.) having a refractive index $n_d$ of about 1.66955 and an Abbe number $v_d$ of about 55.4 at a d line, and the second optical member 11 was made of ultraviolet curable resin having a refractive index $n_d$ of about 1.606 and an Abbe number $v_d$ of about 27.3 at the d line. As a result, a refractive index difference $\Delta n_d$ was about 0.06355. In order to realize diffraction efficiency of equal to or greater than about 95% for a blaze wavelength $\lambda_b$, a pitch P was set to about 0.4 (mm) and a curvature radius R was set to about 15 (μm) so as to satisfy the expression (3). The blaze wavelength $\lambda_b$ was set to a C line (about 0.656273 μm). A grating height in this case was about 9.90 (μm). By using the RCWA method, diffraction efficiency for each of wavelengths λ in a visible wavelength range was calculated.

Figure 17:
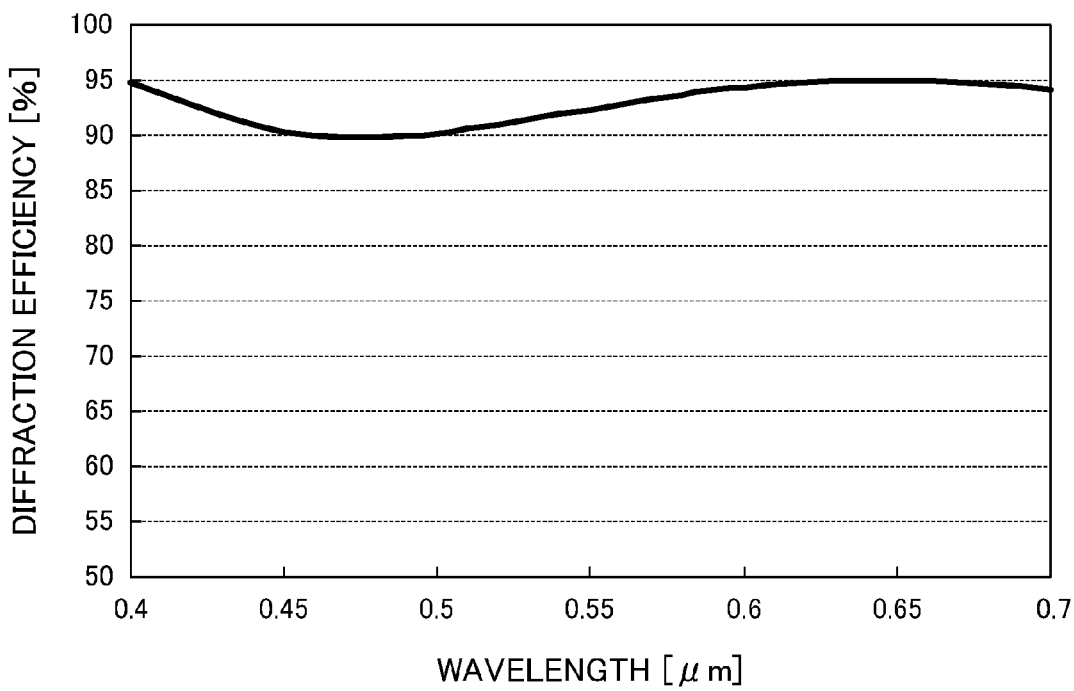
FIG. 17 is a graph illustrating diffraction efficiency in a visible wavelength range of a diffraction grating of a ninth example.

The result is shown in FIG. 17. The diffraction efficiency at the C line is about 95.1%, and the diffraction efficiency of equal to or greater than about 95% is realized as desired. The high diffraction efficiency which is equal to or greater than about 85% can be obtained across the entire visible wavelength range.

Tenth Example

In a tenth example, a first optical member 10 was made of hypothetical resin having a refractive index $n_d$ of about 1.492 and an Abbe number $v_d$ of about 57.4 at a d line, and the second optical member 11 was made of fluorinated resin (resin formed by mixing ITO particulates with "CYTOP" (manufactured by Asahi Glass Co., Ltd.) at an ITO volume ratio of about 17%) having a refractive index $n_d$ of about 1.432 and an Abbe number $v_d$ of about 16.8 at the d line. As a result, a refractive index difference $\Delta n_d$ was about 0.06. In order to realize diffraction efficiency of equal to or greater than about 95% for a blaze wavelength $\lambda_b$, a pitch P was set to about 0.2 (mm) and a curvature radius R was set to about 5 (μm) so as to satisfy the expression (3). The blaze wavelength $\lambda_b$ was set to about 0.62 (μm). A grating height in this case was about 9.94 (μm). By using the RCWA method, diffraction efficiency for each of wavelengths λ in a visible wavelength range was calculated.

Figure 18:
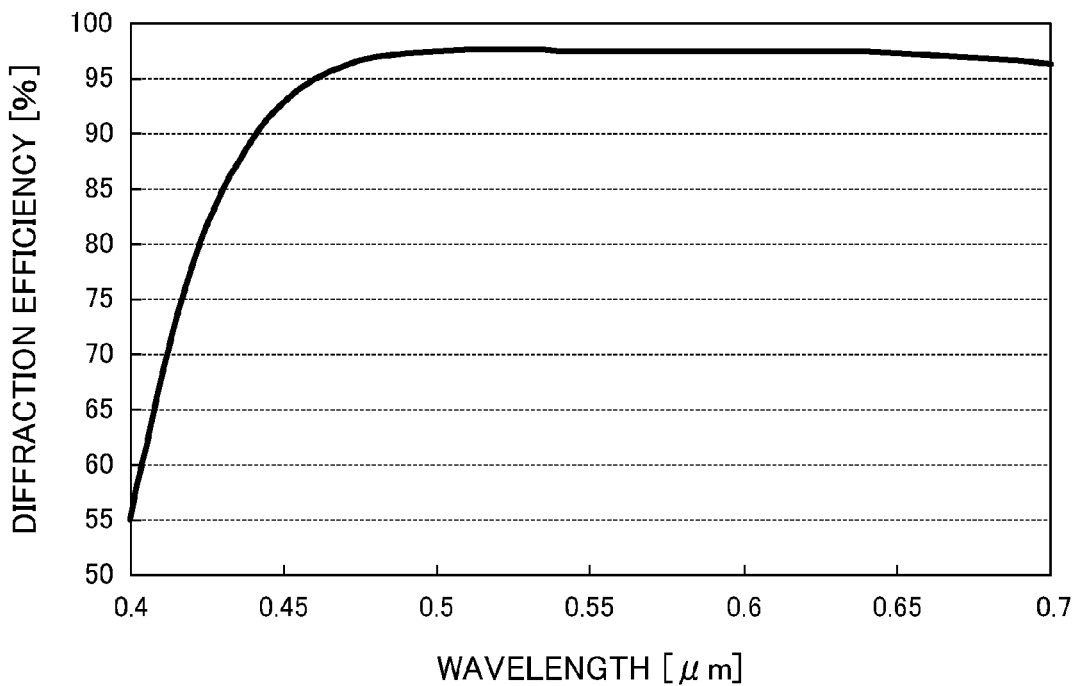
FIG. 18 is a graph illustrating diffraction efficiency in a visible wavelength range of a diffraction grating of a tenth example.

The result is shown in FIG. 18. The diffraction efficiency at the C line is about 97.5%, and the diffraction efficiency of equal to or greater than about 95% is realized as desired. The high diffraction efficiency can be obtained across the entire visible wavelength range. In particular, in a range of equal to or greater than about 0.45 μm, the diffraction efficiency can be equal to or greater than about 95%.

Eleventh Example

In an eleventh example, a first optical member 10 was made of glass (glass K-SFLD4 manufactured by Sumita Optical Glass Inc.) having a refractive index $n_d$ of about 1.7552 and an Abbe number $v_d$ of about 27.5 at a d line, and the second optical member 11 was made of hypothetical resin having a refractive index $n_d$ of about 1.7052 and an Abbe number $v_d$ of about 19.6 at the d line. As a result, a refractive index difference $\Delta n_d$ was about 0.05. In order to realize diffraction efficiency equal to or greater than about 95% for a blaze wavelength $\lambda_b$, a pitch P was set to about 0.6 (mm) and a curvature radius R was set to about 25 (μm) so as to satisfy the expression (3). The blaze wavelength $\lambda_b$ was set to the d line. A grating height in this case was about 11.75 (μm). By using the RCWA method, diffraction efficiency for each of wavelengths λ in a visible wavelength range was calculated.

Figure 19:
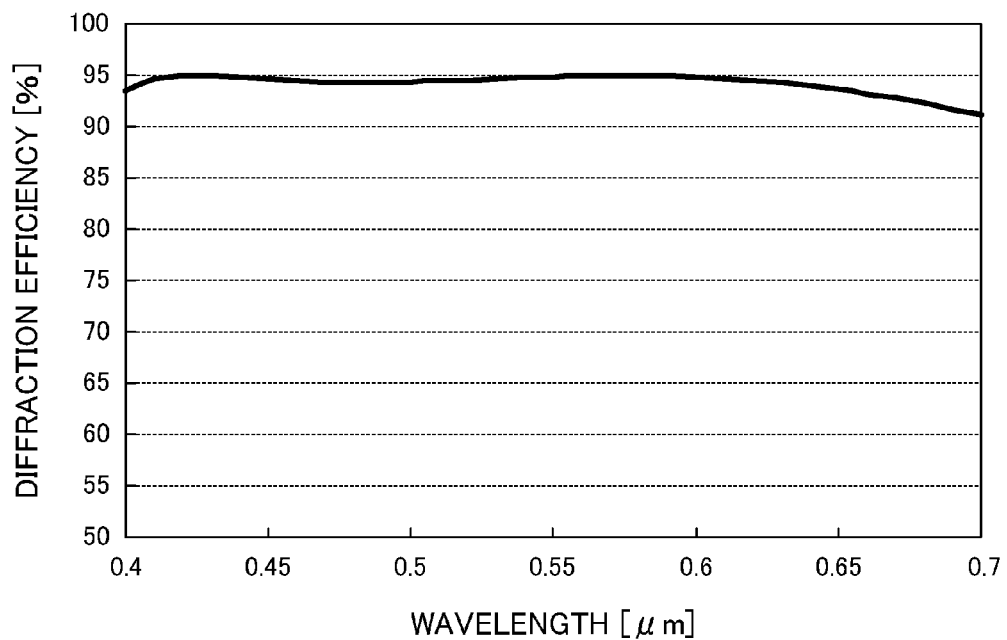
FIG. 19 is a graph illustrating diffraction efficiency in a visible wavelength range of a diffraction grating of an eleventh example.

The result is shown in FIG. 19. The diffraction efficiency at the d line is about 95.0%, and the diffraction efficiency of equal to or greater than about 95% is realized as desired. The high diffraction efficiency which is equal to or greater than about 90% can be obtained across the entire visible wavelength range.

In the foregoing examples, the diffraction efficiency for first-order diffracted light has been described. However, by satisfying the expression (1), (2), or (3), diffraction efficiency for second-order diffracted light can be also improved.

<<Other Embodiments>>

The foregoing embodiment of the present disclosure may have the following configurations.

That is, in the foregoing embodiment, the diffractive optical element 1 is employed in the interchangeable lens 200, but the present disclosure is not limited to such a configuration. The diffractive optical element 1 may be applied as a lens element inside the camera 100. In addition, the present disclosure is not limited to the diffractive optical element 1 serving as the lens, and the diffractive optical element 1 may be applied for purposes other than the foregoing purpose.

In the foregoing embodiment, the first optical member 10 is made of resin material, and the second optical member 11 is made of glass material. However, the present disclosure is not limited to such a configuration. The first optical member 10 may be made of glass material, and the second optical member 11 may be made of resin material. Alternatively, both of the first and second optical members 10, 11 may be made of glass material or resin material. Transparent ceramic may be used instead of glass material or resin material. In other words, the material may have transmission properties in a wavelength range to be used.

Figure 20:
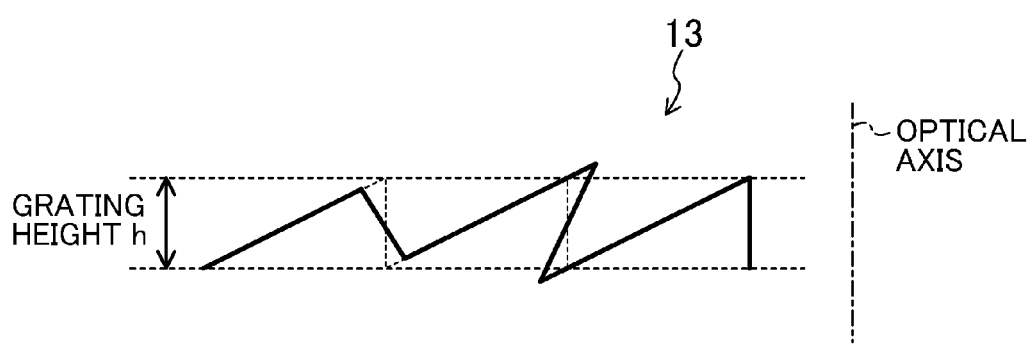
FIG. 20 is a schematic view illustrating a grating height h when a shape of a diffraction grating is non-uniform.

If there are various grating heights as illustrated in FIG. 20, a distance between an intersection point of a line parallel to the optical axis and one of the adjacent inclined surfaces, and an intersection point of the line and the other inclined surface is a grating height h.

The ridge portion 14d of the first diffraction grating 14 does not necessarily have the cross section defining an arc segment of a true circle as long as the ridge portion 14d of the first diffraction grating 14 is curved. In such a case, the curvature radius R may be obtained based on an approximate circle of the cross section of the ridge portion 14d. For example, an image of a cross section of the ridge portion 14d, which is cut along a plane including the optical axis X is taken by a microscope, arbitrary three points on the ridge portion 14d in the taken image are selected, and a radius of an approximate circle is obtained by using the three points. Such a radius may be regarded as the curvature radius R. Alternatively, a plurality of points on the ridge portion 14d in the cross-sectional image may be used to calculate an approximate circle having the minimum rms (root-mean-square), thereby obtaining the curvature radius R. As in such a case, the curved surface of the ridge portion 14d is not limited to the case where the ridge portion 14d has the cross section defining the arc segment of the true circle, and the cross section may be curved so that the approximate circle can be obtained.

As described above, the present disclosure is useful for the diffractive optical element in which the two optical members are stacked, and the diffraction grating is formed at the interface between the two optical members, and the optical device including the diffractive optical element.

The description of the embodiments of the present disclosure is given above for the understanding of the present disclosure. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A diffractive optical element, comprising:
   first and second optical members which are stacked,
   wherein the first optical member includes a diffraction grating in which a plurality of raised portions each having a vertical surface and a surface inclined to the vertical surface are arranged,
   the second optical member includes a diffraction grating in which a plurality of recessed portions are arranged, to which the raised portions are fitted,
   the diffraction grating of the first optical member and the diffraction grating of the second optical member are in close contact with each other,
   a ridge portion formed by the vertical and inclined surfaces of the raised portion defines a curved surface, and
   the following expression (1) is satisfied when a curvature radius of the curved surface is R (μm) and a pitch of the raised portions is P (mm):

$$R \leq A_1 \times P^3 + B_1 \times P^2 + C_1 \times P \tag{1}$$

where $\Delta n_d$ is a refractive index difference between the first and second optical members at a d line,
$A_1 = -78479 \times \Delta n_d^2 + 20869 \times \Delta n_d + 36.356$,
$B_1 = 19085 \times \Delta n_d^2 + 5119.7 \times \Delta n_d - 370.98$, and
$C_1 = 2050 \times \Delta n_d^2 - 896.21 \times \Delta n_d + 143.61$.

2. The diffractive optical element of claim 1, wherein the following expression (2) is satisfied:

$$R \leq A_2 \times P^3 + B_2 \times P^2 + C_2 \times P \tag{2}$$

where $A_2 = -19157 \times \Delta n_d^2 + 5549.6 \times \Delta n_d + 54.034$,
$B_2 = 8026.7 \times \Delta n_d^2 + 2402.2 \times \Delta n_d - 198.94$, and
$C_2 = 1475.7 \times \Delta n_d^2 - 690.85 \times \Delta n_d + 106.82$.

3. The diffractive optical element of claim 1, wherein the following expression (3) is satisfied:

$$R \leq A_3 \times P^3 + B_3 \times P^2 + C_3 \times P \tag{3}$$

where $A_3 = 2454 \times \Delta n_d^2 + 70.325 \times \Delta n_d + 45.923$,
$B_3 = -2331.4 \times \Delta n_d^2 + 1285.6 \times \Delta n_d - 102.5$, and
$C_3 = 1812.2 \times \Delta n_d^2 - 572.71 \times \Delta n_d + 72.458$.

4. An optical device, comprising:
   an optical imaging system configured to focus light bundles on a predetermined surface,
   wherein the optical imaging system has the diffractive optical element of claim 1.

* * * * *